(12) United States Patent
Branch et al.

(10) Patent No.: US 10,419,393 B2
(45) Date of Patent: Sep. 17, 2019

(54) USING NETWORK CONFIGURATION ANALYSIS TO IMPROVE SERVER GROUPING IN MIGRATION

(71) Applicant: International Business Machines Corporation, Armonk, NY (US)

(72) Inventors: Joel W. Branch, Hamden, CT (US); Michael Elton Nidd, Zurich (CH); Birgit Monika Pfitzmann, Wettswil (CH)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 15/592,283

(22) Filed: May 11, 2017

(65) Prior Publication Data

US 2018/0332109 A1 Nov. 15, 2018

(51) Int. Cl.
*H04L 29/08* (2006.01)
*H04L 29/12* (2006.01)
(Continued)

(52) U.S. Cl.
CPC ...... *H04L 61/2514* (2013.01); *H04L 41/0853* (2013.01); *H04L 41/12* (2013.01);
(Continued)

(58) Field of Classification Search
CPC .............. G06F 9/4856; G06F 3/0647; G06F 2009/4557; H04L 45/02; H04L 41/0853; H04L 41/12
See application file for complete search history.

(56) References Cited

U.S. PATENT DOCUMENTS 8,275,748 B2 9/2012 Nagarajan
8,572,625 B2 10/2013 Huang et al.
(Continued)

OTHER PUBLICATIONS

Tsugawa, M., et al., "User-Level Virtual Networking Mechanisms to support Virtual Machine Migration over Multiple Clouds", Proceedings of the IEEE International Workshop on Management of Emerging Networks and Services, Dec. 6-10, 2010, pp. 1-5.
(Continued)

*Primary Examiner* — Vivek Srivastava
*Assistant Examiner* — Muhammad Raza
(74) *Attorney, Agent, or Firm* — Fleit Gibbons Gutman Bongini Bianco PL; Thomas S. Grzesik

(57) ABSTRACT

Various embodiments manage the migration of servers. In one embodiment, a set of server-level dependency information is obtained for servers to be migrated from a source computing environment to a target computing environment. A set of network configuration data is obtained for a plurality of network devices associated with the servers. The set of server-level dependency information is updated to include one or more additional dependencies of at least one of the servers based on the set of network configuration data. Updating the set of server-level dependency information generates an updated set of dependency information. The servers are assigned to multiple migration groups based on the updated set of dependency information. The migration groups optimize cross-group dependencies among the migration groups.

7 Claims, 3 Drawing Sheets

(51) Int. Cl.
*H04L 29/06* (2006.01)
*H04L 12/24* (2006.01)

(52) U.S. Cl.
CPC .......... *H04L 63/00* (2013.01); *H04L 67/1004* (2013.01); *H04L 67/1038* (2013.01)

(56) References Cited

U.S. PATENT DOCUMENTS

| | | | |
|---|---|---|---|
| 8,813,209 B2 | 8/2014 | Bhattacharya et al. | |
| 8,819,672 B2 | 8/2014 | Joukov et al. | |
| 9,141,919 B2 | 9/2015 | Athey et al. | |
| 9,210,065 B2 | 12/2015 | Hao et al. | |
| 2011/0213883 A1* | 9/2011 | Athey | G06Q 10/06 709/226 |
| 2011/0252403 A1* | 10/2011 | Joukov | G06F 9/4856 717/121 |
| 2011/0302647 A1* | 12/2011 | Bhattacharya | H04L 63/0263 726/11 |
| 2012/0109844 A1 | 5/2012 | Devarakonda et al. | |
| 2012/0131567 A1* | 5/2012 | Barros | G06F 9/5088 717/170 |
| 2013/0246606 A1* | 9/2013 | Branch | H04L 41/0853 709/224 |
| 2013/0275592 A1* | 10/2013 | Xu | H04L 45/14 709/225 |
| 2014/0229949 A1* | 8/2014 | Cai | G06F 9/45533 718/1 |
| 2014/0289198 A1* | 9/2014 | Chikkalingaiah | G06F 16/214 707/634 |
| 2015/0012665 A1* | 1/2015 | Kang | G06F 9/45558 709/245 |
| 2015/0052521 A1 | 2/2015 | Raghu | |
| 2015/0106489 A1 | 4/2015 | Duggirala | |
| 2015/0341428 A1 | 11/2015 | Chauhan | |
| 2015/0381711 A1* | 12/2015 | Singh | H04L 41/0813 709/221 |
| 2016/0323245 A1* | 11/2016 | Shieh | H04L 63/0263 |
| 2017/0017505 A1* | 1/2017 | Bijani | G06F 9/44505 |
| 2017/0048314 A1* | 2/2017 | Aerdts | G06F 9/5083 |
| 2018/0124182 A1* | 5/2018 | Orman | H04L 67/10 |
| 2018/0260241 A1* | 9/2018 | Khurange | G06F 3/0604 |

OTHER PUBLICATIONS

Balani, R., et al., "Columbus: Configuration Discovery for Clouds", Proceedings of the IEEE 34th International Conference on Distributed Computing Systems, Jun. 30-Jul. 3, 2014, pp. 1-10.
U.S. Appl. No. 14/685,948, filed Apr. 14, 2015.

* cited by examiner

USING NETWORK CONFIGURATION ANALYSIS TO IMPROVE SERVER GROUPING IN MIGRATION

BACKGROUND

The present disclosure generally relates to object migration in computing environments, and more particularly relates to migrating objects based on dependencies.

Migration is a process for retaining the functionality of a data center through a significant reconfiguration of the center itself. The reconfiguration may include the replacement of hardware (upgrades, new platform class, physical-to-virtual, etc.) and/or a relocation of hardware to a different room or building. Migration includes moving a number of physical computer systems to a new location, an reconfiguring the physical computer systems for the new network. Other parts of that migration may be physical-to-virtual, where the systems are recreated as virtual servers in a host. Migration also includes transferring the system to new hardware at the new location (as described here). Some systems may remain at the old location (with some reconfiguration), while others are moved to a new location. Migration may be partially performed programmatically to achieve a partially automated migration, freeing up human resources from tedious tasks.

BRIEF SUMMARY

In various embodiments, a method, information processing system, and a computer program product for managing migration of servers are disclosed. In one embodiment, a set of server-level dependency information is obtained for servers to be migrated from a source computing environment to a target computing environment. A set of network configuration data is obtained for a plurality of network devices associated with the servers. The set of server-level dependency information is updated to include one or more additional dependencies of at least one of the servers based on the set of network configuration data. Updating the set of server-level dependency information generates an updated set of dependency information. The servers are assigned to multiple migration groups based on the updated set of dependency information. The migration groups optimize cross-group dependencies among the migration groups.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
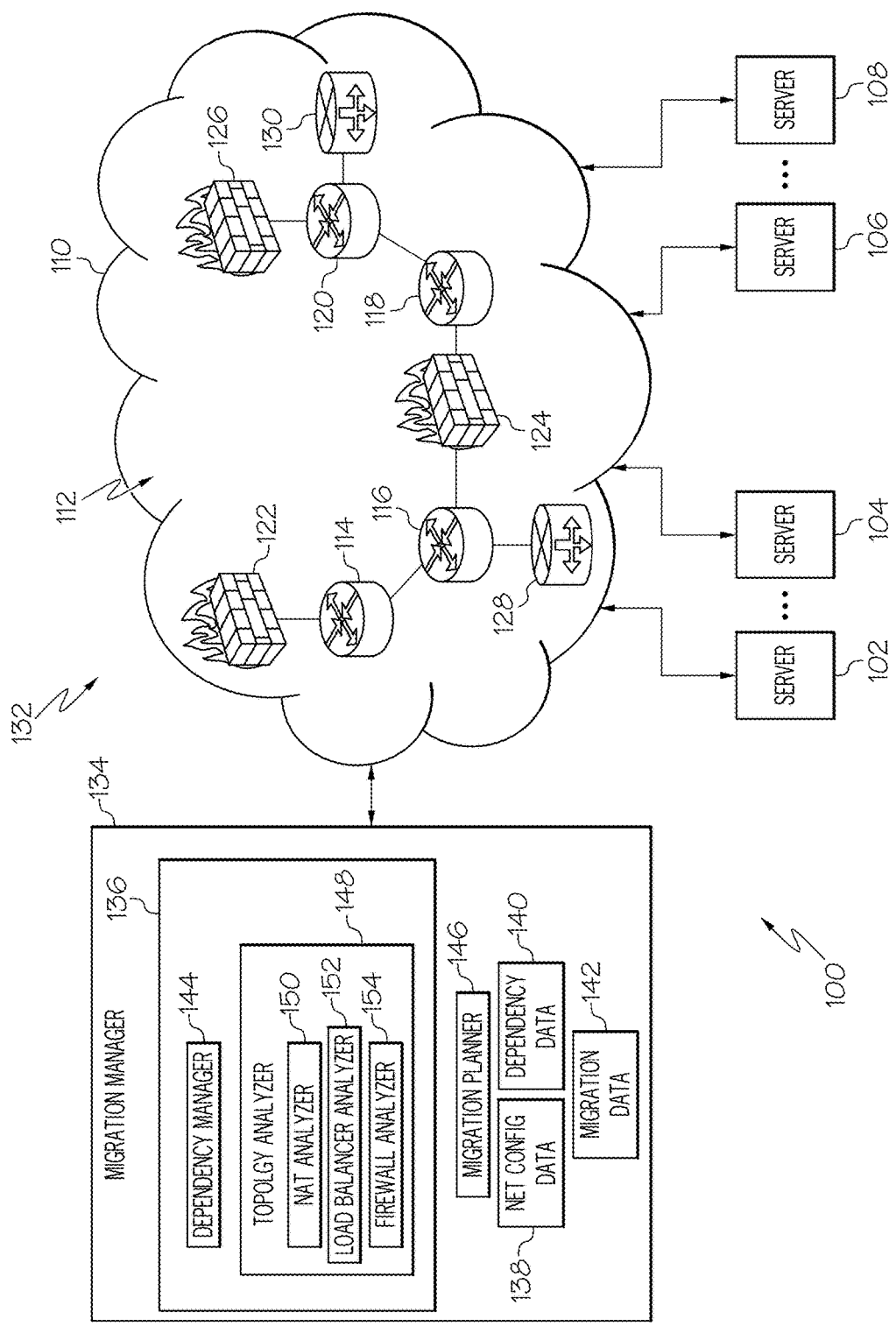
FIG. 1 is a block diagram illustrating one example of an operating environment for managing the migration of servers according to one embodiment of the present disclosure.

In information technology (IT) migration projects, it is difficult to migrate all objects that are to be migrated at the same time. However, it is also not desirable to migrate object by object, because many steps such as placement optimization, mutual addressing of the migrated objects, and testing of overall applications, are better performed with many objects together. IT migration activities include server and application consolidation, transformation, virtualization, etc. One aspect of migration is that certain software objects, such as applications, middleware, or entire operating system images, are to be moved to a different platform, such as other servers, other operating systems, other middleware versions or types, or another environment such as clouds. When an enterprise decides on a migration project, the goal is typically to migrate a large number of objects, so that the resulting savings exceed the planning and execution costs of the migration project. However, one cannot usually move all the objects at once. One reason is that migration is time-consuming. Another reason may be that costs do not permit acquiring all the desired new hardware at the same time, or if the migration is done to consolidate existing hardware or existing facilities, hardware or floor space may need to be freed up by migrating some objects, before migrating other objects.

The opposite extreme, i.e., migrating objects one by one, is also not desirable. For example, one typically wants to move an entire business application at once so that it only needs to be tested once. Furthermore, if one object uses or addresses another object, migrating the used or addressed object means that changes in the using or addressing object need to be made, and the two objects should best be migrated together. Another reason for migrating interacting objects at the same time is related to geographic closeness or good network connectivity. The overall application may not be able to have the desired throughput or latency if some objects have already been migrated and others have not.

Accordingly, one or more embodiments group sever/objects in a wave or waves. A wave is a set of objects that are to be migrated as a logical group and more or less at the same time. Wave planning is needed for cost-effective overall migration projects. The servers (physical and/or virtual) can be grouped according to dependencies, so that most dependencies end up inside one wave, and cross-wave dependencies or relationships only minimally exist. Every server that was decided to be migrated is preferably placed in only one wave after the wave planning. However, sometimes one or more of the initial objects would be replicated or divided up into the objects to be actually migrated depending on need or practical concerns. The dependencies may be weighted.

A process of planning and performing such a migration can be time-consuming, costly, and possible prone to error. For example, a risk is also involved in the migration process due to a high degree of complexity of applications deployed on server devices and their dependencies. Consider a large number of distributed applications that are deployed on a many servers. One server could host an application on a middleware product to meet performance and high availability requirements. That application may be distributed over several server devices. This distributed application may require a database which is deployed on another server device. Messaging components to support information exchange with other internal or external applications may require a set of server devices and be deployed to several application servers (WebSphere® Application Server from International Business Machines (IBM) Corporation of Armonk, N.Y.). A consolidation of this set of servers may require an in-depth knowledge of configurations of the set of servers and an insight into how to best plan and run a migration of source applications to the final target platform.

Dependencies can be collected and determined using various mechanisms such as server configurations and traffic observations on the servers. However, much of the logic that impacts dependencies currently resides within network devices. For example, routers, firewalls, and load balancers may comprise a Network Address Translation (NAT) component that can map Internet Protocol (IP) addresses ranges into other ranges for various reasons such as hiding enterprise-internal addresses from the outside world, using private address spaces internally to save routable public address, load balancing, etc. These address translation operations can be problematic for server migration because the IP addresses observed by conventional dependency detection mechanisms usually show only the virtual IP address (VIP) implemented by the NAT device, rather than the real IP address (RIP) used by the server being contacted. In many instances the dependencies between the servers and the network devices are unknown dependencies because the network devices are not in the discovery range of the conventional dependency detection mechanisms. Also, conventional mechanisms usually cannot determine that there are multiple dependencies with respect to load balancers based on server configurations and traffic observations.

One or more embodiments overcome the above problems by detecting end-to-end dependencies between interacting servers (physical or virtual) despite traffic changes performed by network devices. Network configuration analysis is utilized to improve dependency knowledge and wave planning. For example, dependency information detected at a server is augmented with network-level information to provide more accurate and enhanced knowledge of end-to-end flows/dependencies, clusters, and rarely used flows. Therefore, a better distribution of servers is obtained across the source and target data centers at any time during migration. The performance characteristics between communication servers are optimized (lower delays) and less testing is required since communicating groups of servers are moved as a whole.

Referring now to FIG. 1, one example of an operating environment 100 is illustrated according to one or more embodiments of the present disclosure. The operating environment 100 comprises a plurality of server systems (physical and/or virtual) 102, 104, 106, 108 that are to be migrated from their source data center to a target data center. Each of the servers 102, 104, 106, 108 comprises various types of software (not shown), such as an operating system, a database management system (DBMS), an application server, etc., which are to be migrated along with their respective server. The servers 102, 104, 106, 108 are communicatively coupled to one or more networks 110. The network(s) 108 comprise various network devices/appliances 112 such as routers 114, 116, 118, 120; firewalls 122, 124, 126; and load balancers 128, 130. It should be noted that embodiments of the present disclosure are not limited to the number, type, and configuration of the network devices 112 illustrated in FIG. 1. The arrangement and configuration of the servers, network devices, and their connections is referred to as the network topology 132 of the computing environment/network 100.

The operating environment 100 further comprises one or more information processing systems 134. The information processing system(s) 134 comprise a migration manager 136 (also referred to herein as "migration management module 136"), network configuration data 138, dependency data 140, and migration data 142. It should be noted that the network configuration data 138, dependency data 140, and migration data 142 are not limited to being stored and maintained at the information processing system 134. One or more of these components can be stored on a remote system/repository or be distributed across multiple systems.

The migration manager 136 comprises a dependency manager 144, a migration planner 146, and a topology analyzer 148. The topology analyzer 148 comprises a NAT analyzer 150, a load balancer analyzer 152, and a firewall analyzer 154. It should be noted that these components are not required to reside within the same system, and one or more of these components may be distributed across multiple systems.

As will be discussed in greater detail below, the migration manager 136 utilizes the components shown in FIG. 1 to analyze the network configuration data 138 associated with network devices/appliances 112. Based on this analysis, the dependency manager 110 determines dependencies of the servers 102, 104, 106, 108 generally not obtainable through conventional discovery mechanisms such as server configuration analysis and server-side traffic observation. The dependency manager 110 augments server-level dependencies (e.g., dependencies observed at the server) with the dependencies obtained through network configuration analysis, and stores this augmented data as dependency data 140. The migration planner 146 utilizes the dependency data 140 to generate migration data 142. For example, the migration planner 146 determine groups of servers (i.e., migration waves) to be migrated such that cross-wave relationships are minimized among the migration waves and stores these migration waves as migration data 120. In some embodiments, the migration manager 136 performs automated migration operations based on the migration data 142. The migration manager 136 may also transmit the migration data 142 to one or more systems operated by a user(s) in charge of migration operations, and/or display the migration data 142 to a user via a display coupled to the information processing system 134.

Figure 2:
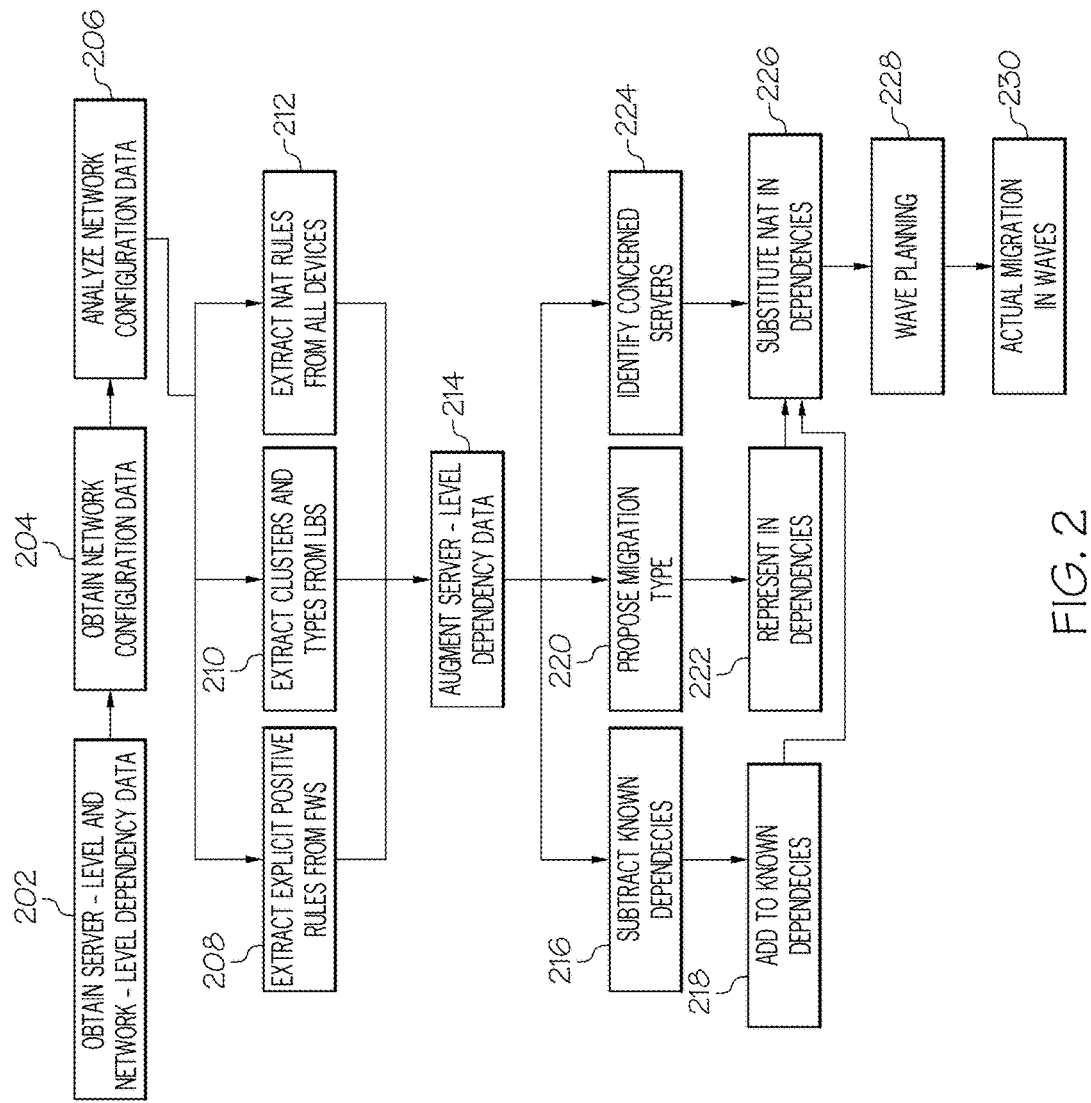
FIG. 2 is an operational flow diagram illustrating an overall process of performing network configuration analysis for obtaining dependency information to be used in wave planning for server migration according to one embodiment of the present disclosure.

Referring now to FIG. 2, an operational flow diagram is shown illustrating an overall process performing network configuration analysis for obtaining dependency information to be used in wave planning for server migration. The dependency manager 144, at step 202, obtains server-level dependency data and network configuration data 138. In one embodiment, the server-level dependency is stored as part of the dependency data 140 at the information processing system and/or at one or more remote systems. The server-level dependency data can be obtained prior to, after, and/or during the process of obtaining the network configuration data 138. Alternatively, the server-level dependency data and the network configuration data 138 can be obtained simultaneously.

Server-level dependency information may be generated utilizing one or more dependency discovery mechanisms/tools such as network observation, observation of network statistics on the servers, observation and analysis of and dependency configurations of the servers and underlying communication software stack, analysis of application log files to identify the relationship, input by a user, running of scripts (such as those executed by the ALDM tool from IBM) to probe the servers or by a use of an inventory management tool (e.g., Tivoli® Application Discovery and Dependency Manager (TADDM) from IBM) used to trace hardware and software deployment, a combination of therefore, etc. One or more of these discovery mechanisms may be implemented as part of the dependency manager 144, as a separate component on the information processing system 134, as component of a remote system, and/or as a component on the servers 102, 104, 106, 108 to be migrated. In embodiments where the discovery mechanisms are implemented on remote systems and/or the servers 102, 104, 106, 108 the dependency manager 144 communicates with these systems via the network 100 and instructs these systems to execute their discovery mechanisms. In another embodiment, the dependency manager 144 prompts a user to activate the discovery mechanisms at their respective system. In a further embodiment, the discovery mechanisms can be executed automatically by their respective system and/or in response to user input at periodic intervals. The server-level dependency information obtained by the discovery mechanisms is then stored as dependency data on their respective system, in a central or distributed repository, at the information processing system 134, and/or the like.

As one example of operations performed during the server-level dependency discovery process the operations performed by the IBM® Analytics for Logical Dependency Mapping (ALDM) tool will now be discussed. ALDM uses the basic infrastructure information about the target IT infrastructure (i.e., installed software and hardware components) as a starting point in the discovery methodology. This information may be provided in the form of a system configuration (SC) model using industry standard representations. An instance of the SC model may be populated by existing IT infrastructure discovery systems such as TADDM or it may be manually populated. The SC instance helps identify data and storage related middleware systems that are present in a particular system configuration. These systems include application servers, database management system (DBMS), file systems, logical volume managers, storage virtualization engines, and RAID (Redundant Array of Independent Disks) systems.

Then, each identified middleware system may be abstracted in a data-locations template (DLT) model, which describes the data locations and data-mapping characteristics of the middleware software components. Specifically, a DLT describes 1) the data types implemented and exported by the component, 2) the mappings of these data types to underlying data types, and 3) reference to introspection support (scripts) to extract data-specific information from software components. DLTs are "point descriptions", that is, each DLT is used to model only a single software component. Only one DLT model may be required for each software component type (e.g., one DLT for IBM DB2* version 9.1). DLTs are, by design, composable through their data mappings. Each data type exported by a DLT is mapped to data type(s) exported by other DLTs creating a composition of the corresponding DLTs.

Composition of DLTs from successively stacked middleware in a given configuration produces a model graph. The model graph is traversed by a distributed crawling algorithm using DLT information along the way to discover end-to-end application—data relationships across the distributed system. Starting at the root elements in the model graph (i.e., the applications and the information entities they use), ALDM uses DLT information to map higher-level data to the lower-level data objects and records the discovered relationships. The process is repeated recursively along the model graph, eventually producing a transitive closure that includes all end-to-end relationships. The crawling algorithm often requires invocation of remote management application programming interfaces (APIs). To avoid the need to install and maintain software ("agents") on the managed environment, ALDM uses ephemeral remote processes ("sensors"), transferring scripts over the network on-demand and executing them on remote management servers with appropriate credentials. This approach is often called "agent-free" discovery.

Although server-level dependency data is helpful in planning server migration this dependency data generally does not comprise all dependencies associated with the respective server. In particular, server-level dependency data usually only comprises direct dependencies of the server as seen from the server. A direct dependency means that Server_1 directly interacts with Object_N (e.g., another server, a network device, etc.). In server migration and consolidation, the main type of direct dependency is that Server_1 establishes a network connection Object_N.

In many instances, most of the logic that impacts dependencies resides in network devices such as routers, load balancers, and firewalls. In particular, network devices perform network translation (NAT) operations for various reasons such as hiding enterprise-internal addresses from the outside world, using private address spaces internally to save mutable addresses, or load balancing. In these (and other) situations, the Internet Protocol (IP) addresses observed by current dependency discovery mechanisms generally only show dependencies between the servers and network devices. In many instances these dependencies appear as unknown dependencies because the network devices are not in the discovery range.

For example, consider a discovery process that scans connections made by a given server. In this example, the discovery process determines the server connects to a group of IP addresses. However, the identified IP addresses are virtual IP addresses as seen from the viewpoint of the server. A network device, which performs NAT operations, receives the connection quests from the server and reroutes the requests to a different IP address based on NAT rules, Therefore, the IP addresses identified by the discovery process are not the actual IP addresses of the end-devices being connected to. Stated differently, any dependencies identified by the discovery process in the ab example would not include any of the end-devices associated with the detected connections as dependencies since the connections terminated at a network device performing NAT operations.

The dependency manager 144 overcomes these problems by using network configuration data 138 to resolve indirect, dangling, missing, etc. dependencies and obtain end-to-end dependencies between interacting servers despite traffic changes performed by network devices. Network configuration data 138 is collected, in step 204, from network devices/appliances 112 within the environment 100 utilizing network configuration collection tools, configuration output scripts, and/or the like. These collection tools/mechanisms can be implemented on the information processing system 134, one or more remote systems, and/or the network devices/appliances 112. In embodiments where these mechanisms are implemented on remote systems and/or the network devices/appliances 112 the dependency manager 144 communicates with these systems via the network 100 and instructs these systems to output their current configuration(s). In another embodiment, the dependency manager 144 prompts a user to activate the collection mechanism(s) at their respective system. In a further embodiment, the collection mechanisms can be executed automatically by their respective system and/or in response to user input at periodic intervals. The network configuration data 138 obtained by the collection mechanisms is then stored as network configuration data 138 on their respective system, in a central or distributed repository, at the information processing system 134, and/or the like.

One example of a network configuration collection mechanism is the SCOPE discovery tool available from IBM Corporation. The SCOPE mechanism uses a combination of network-based probes from TADDM, and script libraries that are initiated directly by server administrators or by way of an automated mechanism. The scripts utilized may be local scripts that are executed on dependency manager 144 and/or remote scripts executed on the network devices 112. In addition, Simple Network Management Protocol (SNMP) mechanisms may be used to gather configuration information about the network devices 112. SNMP is very useful for collecting information from network appliances. The command line interfaces on network appliances can vary widely between vendors, and SNMP offers a more predictable and standardized interface for gathering configuration information. SNMP version 3 allows user/password authentication, but older SNMP versions rely on knowledge of a "Community String". Particularly because of this history of weak access protection, it is normal to use a white-list to identify which source IP addresses are permitted to access the SNMP interface of a network appliance. Thus, in order to utilize SNMP as one of the collection tools, it may be necessary to establish a white list or community string that permits the SNMP based discovery tools to access and gather the configuration information from the various devices/appliances of the network topology.

Another example of a network configuration collection mechanism are local and remote scripts, which can be used to gather configuration information from server computing devices in the network topology since load balancers, firewalls, and other transparent network communication interception appliances are typically hosted or implemented on server computing devices or in association with server computing devices. For instance, ALDM is a suite of scripts that runs utilities like Unix ifconfig and lsof, then archives the results along with copies of particular configuration files and allows the results to be easily delivered to a discovery mechanism, and imported from there into the SCOPE database. TADDM is configured with access credentials (login or SNMP) for some sets of servers, so that it can connect from the network and do much the same thing as ALDM. These are only examples of the types of collection mechanisms that may be used to provide scripting for gathering configuration data from network devices/appliances. Any type of network configuration mechanism/tool that is capable of obtaining network configuration data from network devices 112 may be used without departing from the spirit and scope of the illustrative embodiments. Other network configuration collection mechanisms that may be utilized include direct connections to network Application Program Interfaces (APIs) of installed middleware, fingerprinting systems such as the open source Network Mapper (NMAP) utility, and the like. In addition, administrators of network devices may utilize a user interface such as a web interface to execute the script and/or commands for outputting the configurations of the network devices.

Examples of the types of network configuration data 138 that may be gathered for each device/appliance using one or more network configuration collection mechanisms include (but are not limited to), NAT rules (if available), firewall rules (if available), routing tables, a list of network interfaces (including loopback devices) that contains Media Access Control (MAC) address, IP address, subnet mask, and default gateway information, a dump of the local Address Resolution Protocol (ARP) cache including Static name (DNS) configurations, and/or the like. Any network configuration data useful in mapping a machine reference obtained from the server-level dependency data to a machine associated with the configuration data. In general, network configuration data that allows mapping IP addresses or a fully qualified name to a server identifier is obtained.

Returning now to FIG. 2, the topology analyzer 148 analyzes the network configuration data 138, at step 206. In one embodiment, the analysis of the network configuration data 138 includes the sub-steps of identifying and analyzing firewall network configuration data (step 208), load balancer network configuration data (step 210), and NAT-based network configuration data (step 212). These operations can be performed simultaneously or at different intervals. Regarding the analysis of firewall network configuration data (step 208), the firewall analyzer 154 analyzes the network configuration data 138 for firewall rules then extracts and stores explicit positive rules. Explicit firewall rules refer to rules where both endpoints are single IP addresses or rules where both endpoints are single IP addresses or small groups of addresses. Less explicit positive rules (e.g., where one or both endpoints are a subnet) may also be extracted as well.

Regarding the analysis of load balancer network configuration data (step 210), the load balancer analyzer 152 analyzes the network configuration data 138 for load balancer information. For example, the load balancer analyzer 152 determines load-balanced clusters from the network configuration data 138. Load-balanced clusters are important to identify since, depending on the type of cluster, they either need to be migrated as a whole or may be used for zero-downtime migration (by stepwise migration). Many clusters are front-end loaded by a load balancer so that the same traffic can reach any of the cluster servers. Therefore, clusters can be well analyzed by obtaining load balancer configurations. Knowing about clusters is also important for cloud-fitness and target planning since clusters are not typically discovered on the servers, and virtualizability and certain operating systems aspects are different for clusters than for individual servers.

Regarding the analysis of NAT-based network configuration data (step 212), the NAT analyzer 150 analyzes the collected network configuration data 138 for NAT-based data and rules. The NAT analyzer 150 extracts and stores any identified NAT-based data/rule. NAT data/rules remap an IP address space into another using an address translation table. In particular, NAT operations translate IPv4 addresses and TCP/UDP port numbers of request packets originating from a client on a private network, and forwards the translated packets to a destination system on a public network. The NAT device then performs reverse translation for response packets sent by the destination system back to the client. NAT rules may apply to particular destination addresses; or may filter based on source, destination, port number, data content, etc.

For example, consider a local client with a private IP address of 192.168.1.1. The local client sends a request to a remote system having a public address of A.B.C.D. The NAT device such as a router intercepts this request and maintains data (e.g., source private address and port, destination public address and port, etc.) regarding this request in a table. The NAT device translates the private address of the local client to its public address and forwards the request to the remote system. The remote system sends a response packet(s) to the local client, which is first received by the NAT device. This response has a source address corresponding to the public address of the remote system and the public address of the NAT device resulting from the NAT device translating the local client's private address to the NAT's public address. The NAT device compares the source/destination information in the response packet to the data in its table and determines the response packet is to be sent to the local client. The NAT device performs a reverse translation operation that translates the NAT device's public address to the local client's private address. The NAT device then forwards the response packet to the local client.

In another example, consider a firewall. Firewalls can be physical or virtual network security systems that utilizes predetermined rules to monitor and control incoming/outgoing network traffic. In many instances firewall rules comprise one or more NAT components. For example, a firewall rule may comprise the following format "allow Src=10.0.5.0/24 Dst=203.0.113.0/24 NAT 192.0.2.9". This rule comprises a NAT component that is only applied when the source address of a packet is in the subnet 10.0.5.0/24. Then, if the destination address is in the subnet 203.0.113.0/24 it is replaced by 192.0.2.9. Consequently, in the simple case where 192.0.2.9 is a single server, it is the correct target of all dependencies from any server in 10.0.5.0/24 to any IP address matching 203.0.113.0/24. In this example, the NAT operation may concern the source or destination address in a rule.

Once the NAT, firewall, and load-balancer data has been extracted from the network configuration data 138, the dependency manager 144 augments the server-level dependency information with this data at step 214. In one embodiment, step 214 comprises multiple sub-steps 216 to 224. These operations can be performed simultaneously or at different intervals. In step 216, the dependency manager 144 subtracts known dependencies from the extracted firewall data. For example, if a potential dependency was identified from the firewall data, but is already known in the server-level dependencies (i.e., observed by a server or known from documentation) this dependency is removed from dependency information. If a less explicit positive firewall rule indicated a dependency, then the subtraction operation validates whether there is at least one known dependency in the server-level dependency information that falls under this rule. If not, a prompt may be generated to request identification of an explicit dependency that is missing, declare the rule obsolete, or leave it as is. In step 218, any dependencies remaining in the extracted firewall network configuration data are then combined with the server-level dependency information and stored as part of the dependency data 140.

In step 220, the dependency manager 144 utilizes the extracted load-balancer network configuration data to propose a migration type for identified clusters. For example, if load balancing for an identified cluster is global (i.e., between difference sites) then the overall cluster can typically tolerate downtime of individual servers. Therefore, the dependency manager 144 generates a migration proposal, which is stored as part of the migration data 142, for the identified cluster that indicates servers of the cluster are to be moved (i.e., in different waves despite dependencies). This can lead to a migration without any down-time. If the site the servers are being migrated to differs from the current sites, then the load balancing has to be extended to this site first. If the load balancing for the identified cluster is local, then the dependency data 140 (including both server and network level dependency information) will indicate whether there are common down-stream dependencies (e.g., on one shared database). If so, the dependency manager 144 generates a migration proposal, which is stored as part of the migration data 142, for the identified cluster that the cluster is to be moved as a whole. Otherwise, the generated migration proposal indicates that an evaluation is to be made whether the local cluster can be made global and then migrated without down-time.

In step 222, the dependency manager 144 represents the identified clusters in the dependency data 140 including any optional end-user feedback on reconfiguration options, to help identify the least disruptive migration plan. Dependencies remain to the whole group, even if it is being migrated in multiple waves, so these are noted for testing and validation of each wave that includes group members. In step 224, the dependency manager 144 analyzes the server-level dependency information to identify unresolved or dangling IP addresses. For example, consider an example where a customer environment includes a load-balanced application for creating authorized price quotes for customers. Because the system is business-critical, it has been installed on three servers that both distribute the computational load during normal operations and also serve as active fail-over systems should one go down. A load balancer has been used to implement this load-balancing configuration, and offers a single front-end address for the system as 10.10.10.10. The actual pricing systems have the following IP addresses: 10.10.10.11, 10.10.10.12, and 10.10.10.13. In preparation for a data center migration, a scan of the existing system is made showing server dependencies on 10.10.10.10. However, the server-level dependency information resulting from the scan does not include any system with the IP address 10.10.10.10 since this address is not assigned to any server in the data center.

The dependency manager 144 determines that IP address 10.10.10.10 was detected during the server-level scan and analyzes the extracted NAT data to resolve this address. For The NAT data indicates that the IP address 10.10.10.10 is actually a virtual IP address. The NAT data further indicates that requests sent to the IP address 10.10.10.10 are forwarded to one of the pricing systems having IP addresses 10.10.10.11, 10.10.10.12, and 10.10.10.13, respectively. Therefore, not only does the dependency manager 144 determine that the IP address 10.10.10.10 is in-scope for the migration effort, but also determines that any dependency on 10.10.10.10 is also a dependency on 10.10.10.11, 10.10.10.12, and 10.10.10.13 (as well as on the load balancer itself). Wave design can now take these expanded groups into consideration. In addition, concerned servers may be identified as well. In particular, if private addresses of real servers are not unique in the computing environment being considered for migration, the dependency manager 144 resolves these private addresses to server identities (e.g., server name or other unique server identifier) using the topology, which is available by combining the routing tables in the network configuration data 138. For example, consider a company that has two security zones that both use address range 10.10.10.0/24, one in Location_A and one in Location_B. If a dependency to a server with address 10.10.10.3 is detected, then knowing which router (or port) will resolve the address indicates which set of servers could possibly be reached.

Once the dependency data 140 has been updated based on the extracted firewall network configuration data and the extracted load-balancing network configuration data, the dependency manager 144 substitutes the extracted NAT data including any identified concerned servers into the dependency data 140, in step 226. For example, importing the firewall rules provides dependencies to/from servers that were not previously identified since the configurations were not detected through conventional dependency analysis Importing the load-balancer rules also provides the clusters that were re-directed by the load balance, turning those virtual addresses into groups of individual "real" addresses. However, some of those "real" addresses might still be NATted. Therefore, a final mapping from the address used by a remote partner to the address that the actual server has configured for itself is performed.

In step 228, the migration planner 146 performs one or more wave planning operations utilizing the updated dependency data 140 and any proposed migration types, which may be stored in the migration data 142). The wave planning operations generate a plurality of waves each identifying a group of servers to be migrated together according to dependencies such that that most dependencies end up inside one wave, and cross-wave dependencies or relationships only minimally exist.

Various wave planning methods may be utilized to generate the waves. The following is non-limiting example of generating waves for migration. In this example, the dependency manager 144 analyzes the dependency data 140 to determine a relationship among the servers to be migrated such that the relationship includes a set of servers having at least one common feature, dependency, or common attribute between the servers in the set. It should be noted that sets may be overlapping. For example, if both Server_A and Server_B depend on Server_C then there is a group [Server_A, Server_C] and also a group [Server_B, Server_C]. In some embodiments, these two groups will be assigned to the same wave.

The relationship determined by the dependency manager 144 may include at least one of a direct dependency, indirect dependency, a common attribute, a common application, a common location among the servers, etc. The dependency manager 144 utilizes the determined relationships to group/assign the servers into a plurality of migration waves such that cross-wave relationships are minimized among the plurality of migration waves. The grouping of the servers includes placing the servers with a same wave-relevant attribute in a same wave using the determined relationships. The wave-relevant attributes may include one or more of a business application, a business owner, a datacenter location, a characteristic of a server platform, etc.

The dependency manager 144 may graphically display the dependencies between the servers (and/or the wave-relevant attributes) to aid in grouping objects for waves. A mapping or other designation of a computing system is provided or created to indicate servers or items to be migrated, and node information with regard to servers to be migrated. This may include the use or creation of a directed graph, a multi-graph or other representation. The dependencies or types of dependencies, the wave-relevant attributes or any other feature may be selected or deselected to assist in determining the servers to be included or excluded from the groupings of the servers. The selection and/or deselection may be indicated in the graphical representation.

The relationships (e.g., dependencies, attributes or other features in the graph) may be weighted to bias groupings of the servers. For example, a particular business application, application location, dependency type, etc. may be deemed more important and may receive a higher weight that would influence which wave the objects should be placed in. The order of migration may also be influence by the weighting. This may include importance weights which could help prioritize which wave of servers are migrated first, and in which order the migration waves should continue. The grouping the server may also include solving a graph partitioning problem, which takes these weights into account.

In step 230, the servers are migrated wave by wave. This migration may be conducted in accordance with a wave plan stored in the migration data 142. The wave plan may include evaluating waves or groups of objects in accordance with criteria. The criteria may include cost, performance metrics, speed of migration, importance or any other criteria.

Figure 3:
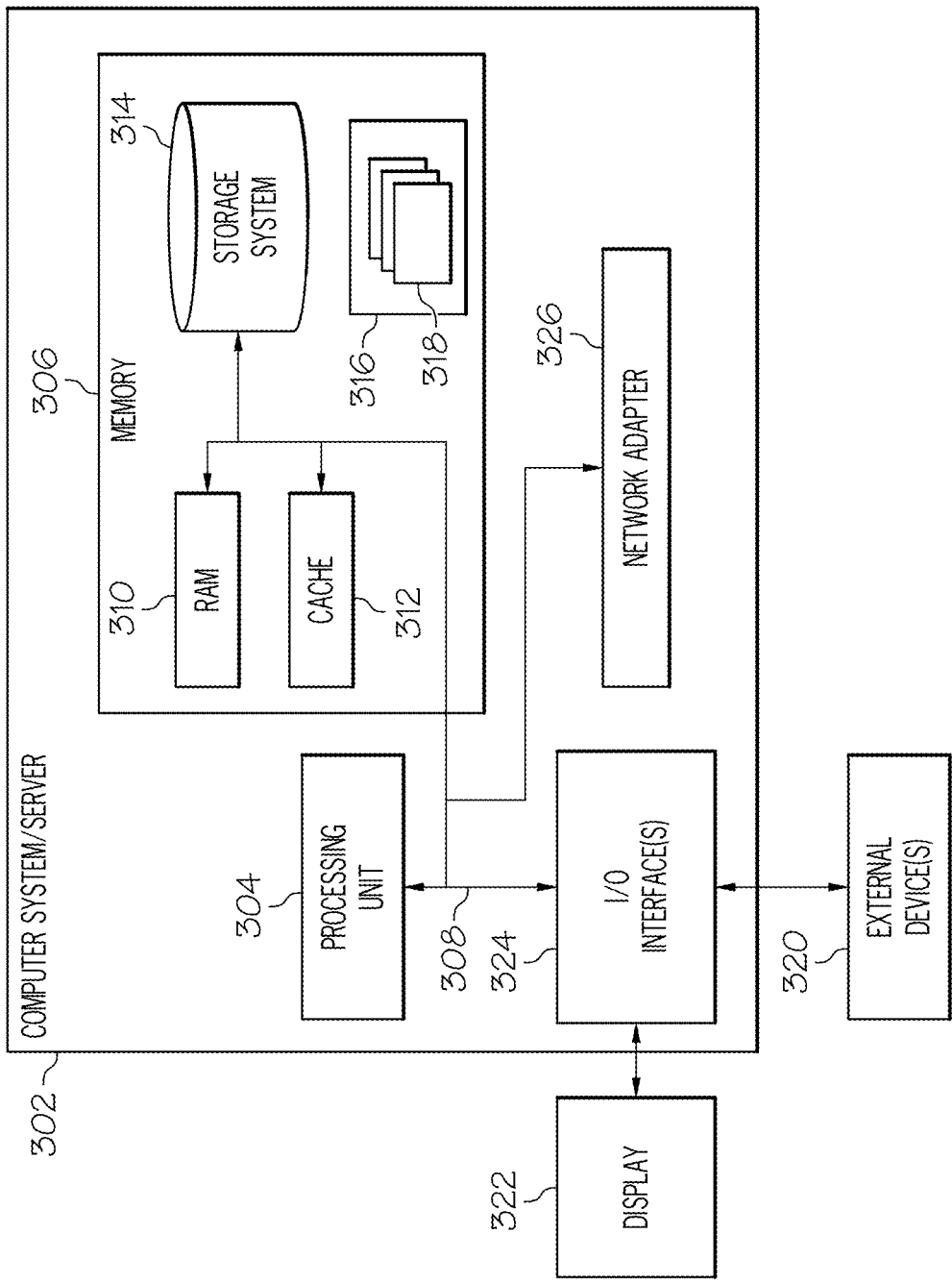
FIG. 3 is a block diagram illustrating one example of an information processing system according to one embodiment of the present disclosure.

Referring now to FIG. 3, this figure is a block diagram illustrating an information processing system, such as the information processing system 134 shown in FIG. 1, which can be utilized in various embodiments of the present disclosure. The information processing system 302 is based upon a suitably configured processing system configured to implement one or more embodiments of the present disclosure. Any suitably configured processing system can be used as the information processing system 302 in embodiments of the present disclosure. The components of the information processing system 302 can include, but are not limited to, one or more processors or processing units 304, a system memory 306, and a bus 308 that couples various system components including the system memory 306 to the processor 304.

Although not shown in FIG. 3, the migration manager 136 and its components, the network configuration data 138, the dependency data 140, and the migration data 142 discussed above with respect to FIGS. 1 and 2 can reside within the main memory 306 and/or the processor 304. These components can also be a separate hardware component as well.

The bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 306 can also include computer system readable media in the form of volatile memory, such as random access memory (RAM) 310 and/or cache memory 312. The information processing system 302 can further include other removable/non-removable, volatile/non-volatile computer system storage media. By way of example only, a storage system 314 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 308 by one or more data media interfaces. The memory 306 can include at least one program product having a set of program modules that are configured to carry out the functions of an embodiment of the present disclosure.

Program/utility 316, having a set of program modules 318, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. Program modules 318 generally carry out the functions and/or methodologies of embodiments of the present disclosure.

The information processing system 302 can also communicate with one or more external devices 320 such as a keyboard, a pointing device, a display 322, etc.; one or more devices that enable a user to interact with the information processing system 302; and/or any devices (e.g., network card, modem, etc.) that enable computer system/server 302 to communicate with one or more other computing devices. Such communication can occur via I/O interfaces 324. Still yet, the information processing system 302 can communicate with one or more networks such as a local area network (LAN), a general wide area network (WAN), and/or a public network (e.g., the Internet) via network adapter 326. As depicted, the network adapter 326 communicates with the other components of information processing system 302 via the bus 308. Other hardware and/or software components can also be used in conjunction with the information processing system 302. Examples include, but are not limited to: microcode, device drivers, redundant processing units, external disk drive arrays, RAID systems, tape drives, and data archival storage systems.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, by at least one information processing system, for managing migration of a plurality of servers, the method comprising:
   obtaining a set of server-level dependency information for servers to be migrated from a source computing environment to a target computing environment, wherein the set of server-level dependency information comprises dependencies of the servers that are observable from the servers;
   obtaining a set of network configuration data for a plurality of network devices associated with the servers, wherein the plurality of network devices are separate and distinct from the servers, and wherein one or more dependencies of the servers that are not observable from the servers are determined based on the set of network configuration data;
   analyzing the set of network configuration data;
   determining, based on the analyzing, that at least one load balancer exists within the source computing environment;
   identifying, based on the set of network configuration data, a cluster of servers associated with the at least one load balancer;
   determining that the set of network configuration data comprises a set of private internet protocol addresses that are not unique in the source computing environment;
   resolving the set of private internet protocol addresses to a set of server identifiers based on a network topology of the source computing environment, wherein the network topology is derived from the set of network configuration data;
   updating the set of server-level dependency information to include one or more additional dependencies of at least one of the servers based on the set of network configuration data and the one or more dependencies, the updating generating an updated set of dependency information, wherein updating the set of server-level dependency information comprises substituting network address translation (NAT) data obtained from the set of network configuration data into the set of server-level dependency information, and wherein substituting the NAT data comprises identifying a set of dependencies in the server-level dependency information each having endpoint pairs covered by a context of the NAT data, and substituting the NAT data into the set of dependencies that has been identified;
   assigning the servers to a plurality of migration groups based on the updated set of dependency information; and
   generating a migration recommendation for the cluster of servers based on the cluster of servers being one of distributed across computing environments or being local to the source computing environment.

2. The method of claim 1, further comprising:
   determining, from the set of network configuration data, at least one explicit positive firewall rule where source and destination endpoints identified in the explicit positive firewall rule are both single Internet Protocol addresses; and
   including the at least one explicit positive firewall rule as a dependency within the updated set of dependency information.

3. The method of claim 1, wherein the plurality of network devices comprises one or more of a router, a load balancer, or a firewall.

4. An information processing system for managing migration of a plurality of servers, the information processing system comprising:
   a memory;
   a processor communicatively coupled to the memory; and
   a migration management module stored on the memory and executed by the processor, wherein the migration management module is configured to perform a method comprising:
     obtaining a set of server-level dependency information for servers to be migrated from a source computing environment to a target computing environment, wherein the set of server-level dependency information comprises dependencies of the servers that are observable from the servers;
     obtaining a set of network configuration data for a plurality of network devices associated with the servers, wherein the plurality of network devices are separate and distinct from the servers, and wherein one or more dependencies of the servers that are not observable from the servers are determined based on the set of network configuration data;
     analyzing the set of network configuration data;
     determining, based on the analyzing, that at least one load balancer exists within the source computing environment;
     identifying, based on the set of network configuration data, a cluster of servers associated with the at least one load balancer;
     determining that the set of network configuration data comprises a set of private internet protocol addresses that are not unique in the source computing environment;
     resolving the set of private internet protocol addresses to a set of server identifiers based on a network topology of the source computing environment, wherein the network topology is derived from the set of network configuration data;

updating the set of server-level dependency information to include one or more additional dependencies of at least one of the servers based on the set of network configuration data and the one or more dependencies, the updating generating an updated set of dependency information, wherein updating the set of server-level dependency information comprises substituting network address translation (NAT) data obtained from the set of network configuration data into the set of server-level dependency information, and wherein substituting the NAT data comprises identifying a set of dependencies in the server-level dependency information each having endpoint pairs covered by a context of the NAT data, and substituting the NAT data into the set of dependencies that has been identified;

assigning the servers to a plurality of migration groups based on the updated set of dependency information; and generating a migration recommendation for the cluster of servers based on the cluster of servers being one of distributed across computing environments or being local to the source computing environment.

5. The information processing system of claim 4, wherein the method further comprises:

determining, from the set of network configuration data, at least one explicit positive firewall rule where source and destination endpoints identified in the explicit positive firewall rule are both single Internet Protocol addresses; and including the at least one explicit positive firewall rule as a dependency within the updated set of dependency information.

6. A computer program product for managing migration of servers, the computer program product comprising a non-transitory computer readable storage medium having program instructions embodied therewith, the program instructions executable by a processor of a computer to cause the computer to:

obtain a set of server-level dependency information for servers to be migrated from a source computing environment to a target computing environment, wherein the set of server-level dependency information comprises dependencies of the servers that are observable from the servers;

obtain a set of network configuration data for a plurality of network devices associated with the servers, wherein the plurality of network devices are separate and distinct from the servers, and wherein one or more dependencies of the servers that are not observable from the servers are determined based on the set of network configuration data;

analyze the set of network configuration data;

determine, based on the analyzing, that at least one load balancer exists within the source computing environment;

identify, based on the set of network configuration data, a cluster of servers associated with the at least one load balancer;

determine that the set of network configuration data comprises a set of private internet protocol addresses that are not unique in the source computing environment;

resolve the set of private internet protocol addresses to a set of server identifiers based on a network topology of the source computing environment, wherein the network topology is derived from the set of network configuration data;

update the set of server-level dependency information to include one or more additional dependencies of at least one of the servers based on the set of network configuration data and the one or more dependencies, the update generating an updated set of dependency information, wherein the program instructions cause the computer to update the set of server-level dependency information by substituting network address translation (NAT) data obtained from the set of network configuration data into the set of server-level dependency information, and wherein the program instructions cause the computer to substitute the NAT data by identifying a set of dependencies in the server-level dependency information each having endpoint pairs covered by a context of the NAT data, and substituting the NAT data into the set of dependencies that has been identified;

assign the servers to a plurality of migration groups based on the updated set of dependency information; and generate a migration recommendation for the cluster of servers based on the cluster of servers being one of distributed across computing environments or being local to the source computing environment.

7. The computer program product of claim 6, wherein the program instructions further cause the computer to:

determine, from the set of network configuration data, at least one explicit positive firewall rule where source and destination endpoints identified in the explicit positive firewall rule are both single Internet Protocol addresses; and include the at least one explicit positive firewall rule as a dependency within the updated set of dependency information.

* * * * *